United States Patent
Yu et al.

(10) Patent No.: US 10,397,878 B2
(45) Date of Patent: Aug. 27, 2019

(54) DYNAMIC DOWNLINK POWER ALLOCATION FOR SUPPORTING HIGHER ORDER MODULATION

(71) Applicant: Telefonaktiebolaget LM Ericsson (publ), Stockholm (SE)

(72) Inventors: Ping Yu, Ottawa (CA); Peter Hazy, Ottawa (CA); Tommy Ivarsson, Ottawa (CA); Christien Leblanc, Moncton (CA); Hong Ren, Kanata (CA); Eliana Yepez, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/772,871

(22) PCT Filed: Nov. 20, 2015

(86) PCT No.: PCT/IB2015/059022
§ 371 (c)(1),
(2) Date: May 2, 2018

(87) PCT Pub. No.: WO2017/085534
PCT Pub. Date: May 26, 2017

(65) Prior Publication Data
US 2018/0324705 A1 Nov. 8, 2018

(51) Int. Cl.
*H04W 52/26* (2009.01)
*H04W 72/04* (2009.01)
(Continued)

(52) U.S. Cl.
CPC ......... *H04W 52/143* (2013.01); *H04L 1/0001* (2013.01); *H04L 1/0003* (2013.01);
(Continued)

(58) Field of Classification Search
CPC ........... H04W 52/143; H04W 72/0473; H04W 52/24; H04W 52/365; H04W 52/262;
(Continued)

(56) References Cited

U.S. PATENT DOCUMENTS

2011/0281614 A1* 11/2011 Kitahara ............. H04W 52/146
455/522
2015/0036590 A1 2/2015 Lahetkangas et al.
(Continued)

FOREIGN PATENT DOCUMENTS

WO 2014/065711 A1 10/2014
WO 2014/165711 A1 10/2014
(Continued)

OTHER PUBLICATIONS

International Search Report and Written Opinion of the International Searching Authority dated Jul. 28, 2016 issued in corresponding PCT Application Serial No. PCT/IB2015/059022, consisting of 9 pages.
(Continued)

*Primary Examiner* — Dong-Chang Shiue
(74) *Attorney, Agent, or Firm* — Sage Patent Group (57) ABSTRACT

A method and network entity for enabling higher order modulation (HOM) mode support for HOM capable wireless devices. The method includes determining a legacy mode power offset value for HOM mode capable wireless devices in legacy modulation mode and calculating a power headroom value for sending downlink data to the HOM mode capable wireless devices. When the power headroom value exceeds a threshold value, the HOM mode support for the HOM mode capable wireless devices is enabled using the identified legacy mode power offset value. When the power headroom value does not exceed the threshold value, and a HOM mode power offset value is available, the HOM mode
(Continued)

power offset value being less than the legacy modulation mode power offset value, the HOM mode support for the HOM mode capable wireless devices is enabled using the HOM mode power offset value.

22 Claims, 7 Drawing Sheets (51) Int. Cl.

| | |
|---|---|
| H04W 52/14 | (2009.01) |
| H04L 1/00 | (2006.01) |
| H04L 27/00 | (2006.01) |
| H04W 52/36 | (2009.01) |
| H04L 27/34 | (2006.01) |
| H04W 52/24 | (2009.01) |
| H04L 5/14 | (2006.01) |
| H04W 52/22 | (2009.01) |

(52) U.S. Cl.
CPC .......... *H04L 1/0015* (2013.01); *H04L 1/0026* (2013.01); *H04L 27/0008* (2013.01); *H04L 27/3488* (2013.01); *H04W 52/24* (2013.01); *H04W 52/262* (2013.01); *H04W 52/365* (2013.01); *H04W 72/0473* (2013.01); *H04L 5/1453* (2013.01); *H04W 52/226* (2013.01)

(58) Field of Classification Search
CPC ............. H04W 52/226; H04L 27/3488; H04L 1/0001; H04L 27/0008; H04L 1/0026; H04L 1/0015; H04L 1/0003; H04L 5/1453
See application file for complete search history.

(56) References Cited

U.S. PATENT DOCUMENTS

2015/0117568 A1 4/2015 Wang et al.
2017/0353930 A1* 12/2017 Su ....................... H04W 52/262

FOREIGN PATENT DOCUMENTS

| WO | 2015/071535 A1 | 5/2015 | |
| WO | WO-2015071535 A1 * | 5/2015 | ............ H04W 52/16 |

OTHER PUBLICATIONS

3GPP TS 36.213 V12.0.0 (Dec. 2013) 3rd Generation Partnership Project; Technical Specification Group Radio Access Network; Evolved Universal Terrestrial Radio Access (E-UTRA); Physical Layer Procedures (Release 12), consisting of 189 pages.

3GPP TS 36.306 V12.0.0 (Mar. 2014) 3rd Generation Partnership Project; Technical Specification Group Radio Access Network; Evolved Universal Terrestrial Radio Access (E-UTRA); User Equipment (UE) Radio Access Capabilities (Release 12), consisting of 29 pages.

3GPP TS 36.331 V12.0.0 (Dec. 2013) 3rd Generation Partnership Project; Technical Specification Group Radio Access Network; Evolved Universal Terrestrial Radio Access (E-UTRA); Radio Resource Control (RRC); Protocol Specification (Release 12), consisting of 349 pages.

* cited by examiner

DYNAMIC DOWNLINK POWER ALLOCATION FOR SUPPORTING HIGHER ORDER MODULATION

CROSS-REFERENCE TO RELATED APPLICATIONS

This application is a Submission Under 35 U.S.C. § 371 for U.S. National Stage Patent Application of International Application Number: PCT/IB2015/059022, filed Nov. 20, 2015 entitled "DYNAMIC DOWNLINK POWER ALLOCATION FOR SUPPORTING HIGHER ORDER MODULATION" which is incorporated in its entirety herein by reference.

TECHNICAL FIELD

The present disclosure relates to a method and network entity for use in wireless communication systems, and more particularly, to a method and network entity for enabling higher order modulation support for wireless devices and adjusting power allocation accordingly.

BACKGROUND

In Long Term Evolution (LTE) systems, advanced modulation has been introduced for use in downlink transmissions to increase the wireless device's data throughput when channel link quality is good. With the addition of advanced modulation, a downlink transmission from network node such as a base station or an evolved Node B (eNB) to a connected wireless device, such as a user equipment (UE), can be configured as either a higher order modulation (HOM) mode, where the modulation set used is, for example, {Quadrature Phase Shifting Key (QPSK), 16 Quadrature Amplitude Modulation (QAM), 64 QAM, 256 QAM}, or a legacy mode, where the modulation set used can be, for example, {QPSK, 16 QAM, 64 QAM}. Depending upon the downlink channel feedback from the wireless device, the base station, e.g., eNB, can select one of these download transmission modes.

Downlink transmissions to a wireless device can use 256 QAM modulation if the wireless device supports HOM mode and if the wireless device is configured in HOM mode. 256 QAM modulation configures each modulation symbol carry 8 bits of information, so that the peak throughputs can be up to 33% higher than using 64QAM where each symbol uses 6 bits.

The Third Generation Partnership Project ("3GPP") defines different sets of mapping to be applied for wireless devices operating in HOM mode (referred to herein as "HOM capable wireless devices in HOM mode") compared to wireless devices operating with non-HOM legacy modulations only. The wireless devices that can only operate with legacy modulation schemes can be wireless devices that are non-HOM capable wireless devices (referred to herein as "legacy wireless devices") or wireless devices that are HOM capable wireless devices in legacy mode (referred to herein as "HOM capable wireless devices in legacy mode" or "HOM mode capable wireless devices in legacy modulation mode").

Tables may be used for mapping Channel Quality Indicator (CQI) reports to signal to interference plus noise ratio (SINR) values. A HOM wireless device uses an alt-CQI table for reporting its channel quality, in which a CQI value maps higher modulations and code-rates than one from the legacy CQI table. Tables may also be used for mapping modulation and coding scheme (MCS) to transport block sizes. The mapping table for HOM wireless devices has fewer row entries for lower modulations and additional ones for 256 QAM.

A HOM-capable wireless device can be configured to operate in HOM mode or legacy modulation mode. Decisions are made by the base station, and in some embodiments, a Radio Resource Control (RRC) reconfiguration message is sent to the wireless device informing the wireless device of a modulation mode switch. According to 3GPP standards, Downlink Control Information (DCI) format 1A, the legacy modulation mode is applied for downlink data transmission during the mode transition period.

HOM-capable wireless devices may travel to a location, such as a cell edge, where the performance in HOM mode is worse than in legacy modulation mode due to lack of sufficient MCS options for QPSK ranges. Strategies are required for the base station to decide the best time for reconfiguring a HOM-capable wireless device with a preferable modulation mode.

While high order modulation provides higher throughputs, it requires cleaner radio channel conditions with low Error Vector Magnitude (EVM) tolerance, approximately <2%. Under a high EVM, data transmission with 256 QAM may result in a higher Block Error Rate (BLER), which in turn makes 256 QAM performance even worse than using a lower level modulation, such as 64 QAM.

The 3GPP standards specify an EVM of 3.5% for 256 QAM while manufacturers pursue better quality of radio performance with desired coverage, such as, for example, 2%. A low EVM can be achieved by having a large peak-to-average ratio (PAR) clipping threshold on a radio to minimize clipping, which is a significant source for EVM. In the present disclosure, the PAR clipping threshold is also referred as "power headroom."

The 3GPP standards define the term "p-a" which refers to the power offset for Resource Elements (REs) at Physical Downlink Shared Channel (PDSCH) type A symbols toward cell reference signal (CRS) power. The type A symbols are the Orthogonal Frequency Division Multiplexing (OFDM) symbols without cell-specific reference signals. In the present disclosure, the terms "p-a value," "p-a power offset value" and "power offset value" are used interchangeably. The 3GPP standards allow different p-a values to be configured for different wireless devices, therefore making it possible to have different power offsets for the downlink physical channel of different wireless devices. P-a values can be configured for any ranges, including, for example, {−6, −4.77, −3, −1.77, 0, 1, 2, 3}. An offset may also be applied to the type B symbols with p-b configurations. The type B symbols are the OFDM symbols with cell-specific reference signals. The parameter p-b is essentially the energy per RE ratio between that for type B symbol REs and type A symbol REs.

As described above, larger power headroom can result in lower EVM. However, increasing power headroom may result in reducing the radio transmission power for a given radio. One way to reduce transmission power is to maintain the power share and reduce power for all users. However, in this case, the cell coverage is adversely impacted. If a cell is designed for medium or large coverage, or its radio is also used with other technologies that need a share of the total available power, reducing the needed maximum power will reduce the cell coverage from the initial base station deployment plan, which will increase cell edge wireless device drop rates. More advanced radios could be manufactured to provide high power with low EVM but this will result in a higher cost for customers who would have to upgrade their radio hardware. Customers may not be willing to replace their existing radios with newer, advanced versions, just so the radios can support HOM in an already existing cell. If radios cannot provide enough radio power headroom as required for low EVM, downlink data transmission using 256 QAM may result in a high BLER due to radio power clipping. Thus, such modulation is not recommended. Further, HOM-capable wireless devices would lose their advantage for providing higher throughput and base stations would not obtain the benefit of potentially higher downlink data transmission capacity.

SUMMARY

The present disclosure advantageously provides a method and network entity for enabling HOM mode support for HOM mode capable wireless devices in a wireless communication network. According to one broad aspect of the disclosure, a method for enabling HOM mode support for at least one HOM capable wireless device is provided. The method includes determining a legacy mode power offset value for at least one of the at least one HOM mode capable wireless device in legacy modulation mode and calculating a power headroom value for sending downlink data to the at least one HOM mode capable wireless device. When the power headroom value exceeds a threshold value, the method further includes enabling the HOM mode support for at least one of the at least one HOM mode capable wireless device using the identified legacy mode power offset value. When the power headroom value does not exceed the threshold value, the method includes determining when a HOM mode power offset value is available. The HOM mode power offset value corresponds to a lower energy per resource element (EPRE) than an EPRE corresponding to the legacy mode power offset value. When the HOM mode power offset value is available, the method further includes enabling the HOM mode support for at least one of the at least one HOM mode capable wireless device using the HOM mode power offset value.

According to one embodiment of this aspect, when the HOM mode support is enabled, the method further includes receiving a trigger to switch at least one of the at least one HOM capable wireless device from at least one of the legacy modulation mode to the HOM mode and the HOM mode to the legacy modulation mode. According to another embodiment of this aspect, the trigger is based on at least a distance between the at least one HOM mode capable wireless device and a network entity. According to another embodiment of this aspect, the trigger is based upon at least one of channel quality indicator (CQI) information received from an uplink transmission of the at least one HOM capable wireless device and an outer loop adjustment value for maintaining a target block error rate (BLER).

According to another embodiment of this aspect, the method further includes transmitting, to at least one of the at least one HOM mode capable wireless device, a radio resource control (RRC) reconfiguration message, the RRC reconfiguration message requesting that at least one of the at least one HOM mode capable wireless device is enabled for the HOM mode. According to another embodiment of this aspect, the RRC reconfiguration message contains one of the legacy mode power offset value when the at least one HOM mode capable wireless device is configured for legacy modulation mode and the HOM mode power offset value when the at least one HOM mode capable wireless device is configured for HOM mode.

According to another embodiment of this aspect, the method further includes assigning, to at least one of the at least one HOM mode capable wireless device, a power balancing parameter to account for differences between Orthogonal Frequency Division Multiplexing, OFDM, symbols. According to another embodiment of this aspect, the method further includes scheduling at least one of the at least one HOM mode capable wireless device and at least one legacy modulation mode wireless device during a transmission time interval (TTI) when the HOM power offset value is different from the legacy power offset value. The scheduling includes determining a number of unused PRBs based on a number of PRBs allocated to at least one of at least one non-HOM mode capable wireless device and the at least one HOM mode capable wireless device in legacy modulation mode. According to another embodiment of this aspect the method further includes scheduling at least one of the at least one HOM mode capable wireless device and no other legacy mode wireless devices during a TTI when the HOM mode power offset value is different from the legacy mode power offset value. The scheduling includes assigning, to at least one of the at least one HOM mode capable wireless device, a number of unused PRBs for the TTI based on at least one of a number of PRBs allocated to the at least one HOM mode capable wireless device and the HOM mode power offset value.

According to another embodiment of this aspect, the method of further includes receiving acknowledgement that the at least one HOM capable wireless device received the downlink data, and performing link adaptation after the switch of the at least one of the at least one HOM capable wireless device from at least one of the legacy modulation mode to the HOM mode and the HOM mode to the legacy modulation mode. Performing the link adaption includes calculating a gain to interference noise ratio (GINR) after the switch of the at least one of the at least one HOM capable wireless device from the legacy modulation mode to the HOM mode, where the calculated GINR incorporates a difference between a first power spectrum density (PSD) value measured before the switch and a second PSD value measured after the switch.

According to another broad aspect of the disclosure, a network entity configured to enable HOM mode support for at least one HOM mode capable wireless device is provided. The network entity includes a communication interface configured to receive an uplink communication from the at least one HOM mode capable wireless device, and processing circuitry including a memory and a processor, where the memory is in communication with the processor. The memory includes instructions that, when executed by the processor configure the processor to determine a legacy mode power offset value for at least one of the at least one HOM mode capable wireless device in a legacy modulation mode and calculate a power headroom value for sending downlink data to the at least one HOM mode capable wireless device. When the power headroom value exceeds a threshold value, the processor is configured to enable the HOM mode support for at least one of the at least one HOM mode capable wireless device using the identified legacy mode power offset value. When the power headroom value does not exceed the threshold value, the processor is configured to determine when a HOM mode power offset value is available. The HOM mode power offset value corresponds to a lower EPRE than an EPRE corresponding to the legacy mode power offset value. When the HOM mode power offset value is available, the processor is further configured to enable the HOM mode support for at least one of the at least one HOM mode capable wireless device using the HOM mode power offset value.

According to another embodiment of this aspect, when the HOM mode support is enabled, the communication interface is further configured to receive trigger to switch at least one of the at least one HOM mode capable wireless device from at least one of the legacy modulation mode to the HOM mode and the HOM mode to the legacy modulation mode. According to another embodiment of this aspect, the trigger is based on a distance between the at least one HOM mode capable wireless device and the network entity. According to another embodiment of this aspect, the trigger is based upon at least one of channel quality indicator (CQI) information received from an uplink transmission of the at least one HOM mode capable wireless device and an outer loop adjustment value for maintaining a target block error rate (BLER).

According to another embodiment of this aspect, the communication interface is configured to transmit, to the at least one HOM mode capable wireless device, a radio resource control (RRC) reconfiguration message, the RRC reconfiguration message requesting that at least one of the at least one HOM mode capable wireless device is enabled for the HOM mode. According to another embodiment of this aspect, the RRC reconfiguration message contains one of the legacy mode power offset value when the at least one HOM mode capable wireless device is configured for legacy modulation mode and the HOM mode power offset value when the at least one HOM mode capable wireless device is configured for HOM mode. According to another embodiment of this aspect, the processor is further configured to assign, to at least one of the at least one HOM mode capable wireless device, a power balancing parameter to account for power differences between the Orthogonal Frequency Division Multiplexing (OFDM) symbols.

According to another embodiment of this aspect, the processor is further configured to schedule at least one of the at least one HOM mode capable wireless device and at least one legacy mode wireless device during a TTI, when the HOM mode power offset value is different from the legacy mode power offset value. The scheduling includes determining a number of unused PRBs based on a number of PRBs allocated to at least one of at least one non-HOM mode capable wireless device and the at least one HOM mode capable wireless device in legacy modulation mode. According to another embodiment of this aspect, the processor is further configured to schedule at least one of the at least one HOM mode capable wireless device and no other legacy mode wireless devices during a TTI when the HOM mode power offset value is different from the legacy power offset value. The scheduling includes assigning, to at least one of the at least one HOM mode capable wireless device, a number of unused PRBs for the TTI based on at least one of a number of PRBs allocated to the at least one HOM mode capable wireless device and the HOM mode power offset value. According to another embodiment of this aspect, the network the network entity is a base station.

According to another embodiment of this aspect, the communication interface is configured to receive acknowledgement that the at least one HOM capable wireless device received the downlink data. The processor is further configured to perform link adaptation after the switch of the at least one of the at least one HOM mode capable wireless device from at least one of the legacy modulation mode to the HOM mode and the HOM mode to the legacy modulation mode. Performing the link adaption includes calculating a GINR after the switch of the at least one of the at least one HOM capable wireless device from the legacy modulation mode to the HOM mode. The calculated GINR incorporating a difference between a first PSD value measured before the switch and a second PSD value measured after the switch.

According to another broad aspect of the disclosure, a network entity configured to enable HOM mode support for at least one HOM mode capable wireless device is provided. The network entity includes a communication module configured to receive an uplink communication from the at least one HOM mode capable wireless device, a power offset value determination module configured to determine a legacy mode power offset value for at least one of the at least one HOM mode capable wireless device in a legacy modulation mode, a power headroom calculation module configured to calculate a power headroom value for sending downlink data to the at least one HOM mode capable wireless device, and an HOM mode enablement module. When the power headroom value exceeds a threshold value, the HOM mode enablement module is configured to enable the HOM mode support of at least one of the at least one HOM mode capable wireless device using the identified legacy mode power offset value. When the power headroom value does not exceed the threshold value, the HOM mode enablement module is configured to determine when a HOM mode power offset value is available. The HOM mode power offset value corresponds to a lower EPRE than an EPRE corresponding to the legacy mode power offset value. When the HOM mode power offset value is available, the HOM mode enablement module is configured to enable the HOM mode support for at least one of the at least one HOM mode capable wireless device using the HOM mode power offset value.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

The methods and arrangements disclosed herein provide HOM mode support for HOM capable wireless devices by reducing overall power share for wireless devices in HOM mode rather than reducing the power share for each wireless device in the network. Specifically, the present disclosure provides methods and arrangements for reducing the energy per resource element (EPRE) for wireless devices in HOM mode so that their power share is reduced, given the same number of physical resource blocks (PRBs) allocated to those wireless devices. Since wireless devices in HOM mode have enhanced link quality and are not at the cell edge, reducing EPRE for those wireless devices will not impact cell coverage. The EPRE for a wireless device is controlled and/or configured by a power offset value, p-a. By configuring a p-a value corresponding to a lower EPRE for wireless devices in HOM mode, the transmit power is reduced automatically when wireless devices in HOM mode are scheduled by the network entity. The amount of power reduction depends on the number of PRBs assigned to the wireless devices in HOM mode. If no wireless devices in HOM mode are scheduled in a TTI, the transmit power is not reduced.

The present disclosure advantageously provides methods and arrangements that allow HOM mode wireless devices to use 256 QAM in order to achieve high throughput without impacting the performance of other non-HOM wireless devices on the existing deployed network. This provides an overall advantage for HOM mode wireless devices by effectively adapting to the radio channel conditions.

When a HOM mode capable wireless device is in close proximity to the network entity, e.g., a base station such as an eNB, and has a good radio frequency (RF) connection, the HOM mode capable wireless device may be configured for HOM mode along with a lower p-a value because the wireless device does not need large transmission power for downlink data reception. The reduced transmission power gives enough radio power headroom and low EVM for transmitting downlink data by using 256 QAM for the wireless device. When the HOM mode capable wireless device moves away from the network entity towards the cell edge, the wireless device is configured with legacy modulation mode along with a legacy p-a value, which is higher than the p-a value for HOM mode. This provides enough average radio power for transmitting downlink data so the wireless device can still receive data with lower modulations. In some embodiments, the distance between the HOM mode capable wireless device and the network entity may not be sufficient to trigger a modulation mode switch. Other factors, such as CQI information, a hybrid automatic repeat request (HARQ), or other factors may be used with or without the distance between the HOM mode capable wireless device and the network entity to constitute a modulation mode switch for the HOM mode capable wireless device.

Before describing in detail exemplary embodiments that are in accordance with the disclosure, it is noted that the embodiments reside primarily in combinations of apparatus components and processing steps related to enabling network entities, such as base stations, or eNBs, to support HOM modes for at least one HOM capable wireless device in a wireless communication network. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 1:
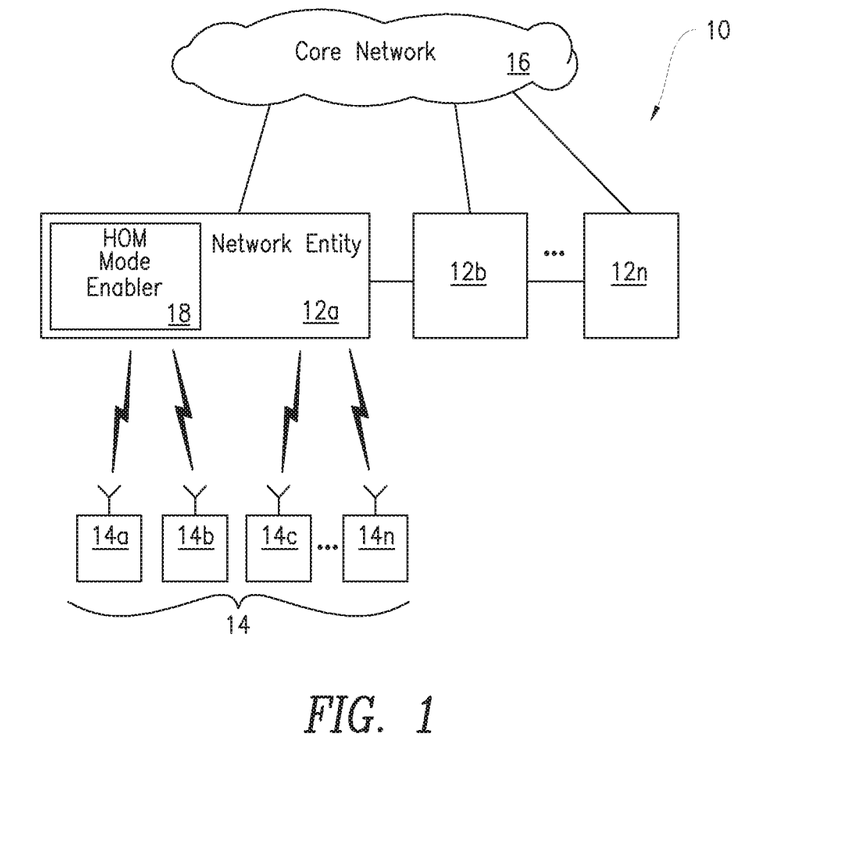
FIG. 1 is a block diagram of an exemplary system for enabling HOM mode support for wireless devices in accordance with the principles of the present disclosure.

Referring now to drawing figures in which like reference designators refer to like elements there is shown in FIG. 1 an exemplary system for enabling HOM mode support for at least one HOM mode capable wireless device in a wireless communication network designated generally as "10." System 10 may be any wireless communication network including, for example, an LTE Radio Access Network (RAN). It will be understood, however, that the present disclosure is not limited to such embodiments and may be embodied generally in any type of wireless communication network according to one or more radio access technologies. System 10 includes one or more network entity 12a, 12b . . . 12n (collectively referred to as "network entity 12") and one or more wireless devices 14a, 14b, 14c . . . 14n (collectively referred to as "wireless device 14"). Among wireless devices 14 are HOM mode capable wireless devices, which are wireless devices capable of communicating in HOM mode. For simplicity, only three network entities 12a, 12b, and 12n are shown in FIG. 1, it being understood that more or fewer than three network entities 12 may be implemented in system 10. Similarly, only four wireless devices 14a, 14b, 14c, and 14n are shown in FIG. 1, it being understood that more or fewer than four wireless devices 14 may be implemented in system 10.

In one embodiment, network entity 12 is a base station, such as an eNB. However, network entity 12 may also refer to a radio base station, base transceiver station, base station controller, network controller, Node B, Radio Network Controller (RNC), relay node, positioning node, Evolved-Serving Mobile Location Center (E-SMLC), location server, repeater, access point, radio access point, Core network node and/or Mobile Management Entity (MME), among other network nodes known in the art. Wireless device 14 may include, for example, user equipment (UE), including devices used for machine type communication, machine to machine communication, sensors, USB, wireless embedded device, laptop mounted devices, etc. Network entities 12 are configured to transmit to and receive information from wireless devices 14, and are also configured to communication with a core network 16.

Network entity 12 includes, in one embodiment, a high order modulation (HOM) mode enabler 18, described in further detail below, which enables the network entity 12 to support HOM mode capable wireless devices 14. Alternately, HOM enabler 18 can be located in a different network entity or the functions performed by HOM mode enabler 18 may be distributed across hardware such as memory and processors of multiple network entities 12. Generally, network entity 12 can support either a legacy modulation mode wireless device 14 or a HOM mode wireless device 14 in system 10. The present disclosure advantageously provides methods and arrangements to configure, in network entity 12, radio power headroom to accommodate both legacy modulation wireless devices 14 and HOM mode wireless devices 14 using multiple power offset values.

Figure 2:
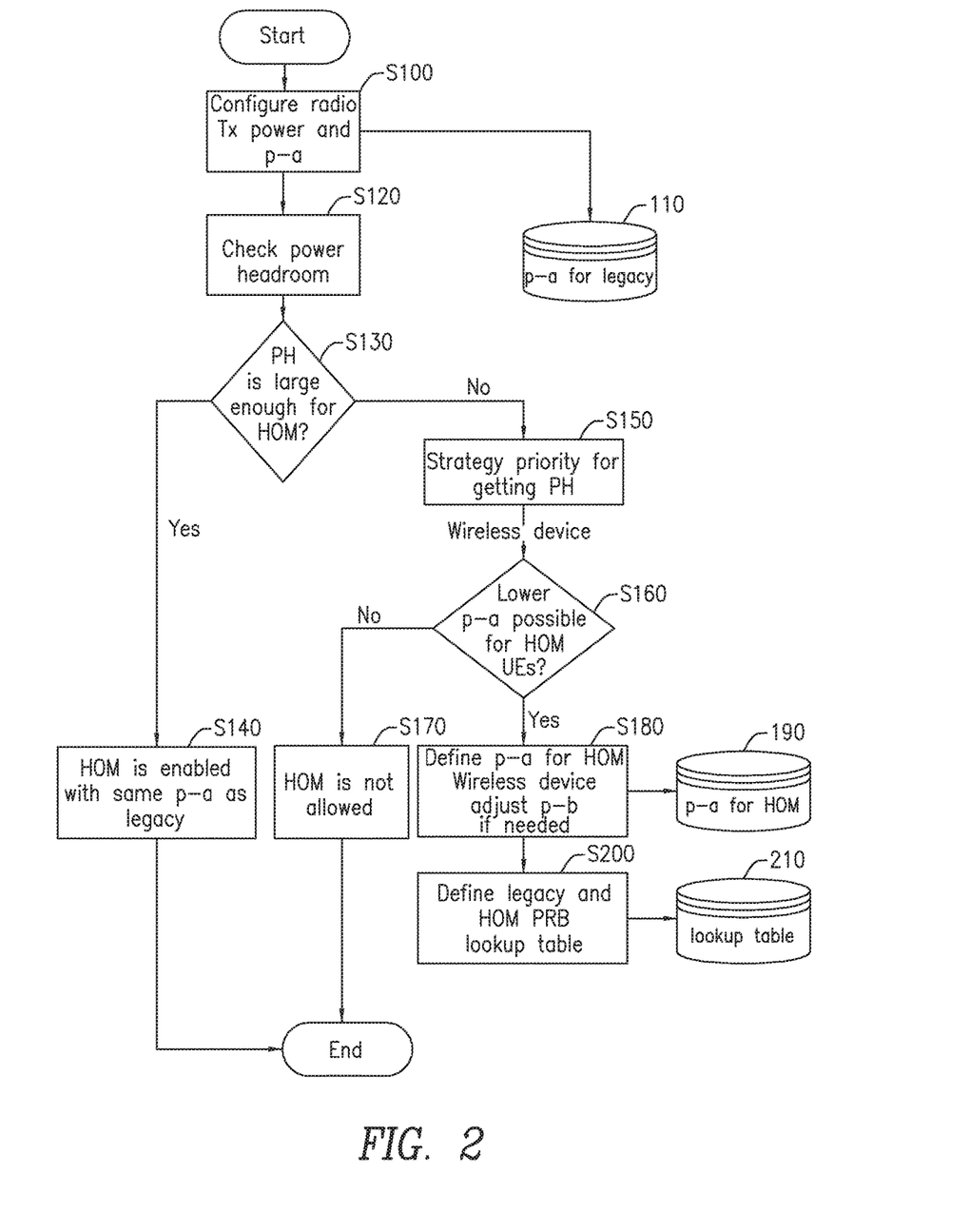
FIG. 2 is a flowchart illustrating an exemplary method for configuring radio power headroom with multiple power offset values for HOM mode and legacy modulation mode wireless devices in accordance with the principles of the present disclosure.

A flow diagram for configuring radio power headroom with multiple power offset values for HOM mode and legacy modulation mode wireless devices is illustrated in FIG. 2. The process illustrated in FIG. 2 may be performed by HOM mode enabler 18, which includes the necessary processing circuitry to carry out the steps illustrated in FIG. 2. During cell activation, and prior to connection between network entity 12 and any of the wireless devices 14 in network 10, network entity 12 configures radio power headroom and its p-a power offset values. In another embodiment, radio power headroom and its p-a power offset values could be configured when radio power that is initially configured for a cell is reduced. This situation may occur when a portion of the radio for the current cell is to be later configured for another network entity, thus sharing the radio power. In this fashion, network entity 12 can determine if it can support HOM mode capable wireless devices 14 based on whether network entity 12 has sufficient power headroom while maintaining cell coverage. In one embodiment, radio transmission power and legacy power offset values are configured for HOM mode capable wireless devices 14 in network 10 that are in legacy modulation mode (Block S100) and the power offset value for legacy mode capable wireless devices 14 is stored in database 110. Network entity 12 may then calculate its maximum power headroom in order to transmit downlink data to the HOM mode capable wireless devices 14 and check to see if there is available power headroom for this transmission (Block S120). Maximum radio power headroom can be calculated, in one embodiment, by comparing the maximum radio power with the currently configured radio power. If there is enough power headroom to accommodate HOM mode capable wireless devices 14 (Block S130), network entity 12 is enabled to support HOM mode capable wireless devices 14 using the legacy p-a value stored in database 110 (Block S140). In other words, there is no need to provide a separate a HOM power offset value since network entity 12 has sufficient power headroom using the power offset configuration for legacy wireless devices 14.

However, if it is determined (at Block S130) that the power headroom available is not large enough to enable downlink transmission to HOM mode capable wireless devices 14 then network entity 12 performs a process for acquiring additional power headroom (Block S150). If the p-a offset value used for wireless devices 14 in legacy modulation mode is already the lowest p-a offset value configured as a general PDSCH offset (i.e., −6 dB) then there is no room to reduce the PDSCH power further.

In this scenario, if network entity 12 has no room for creating additional power headroom for the necessary low EVM required for 256 QAM, then HOM mode is not allowed to be configured to wireless devices 14 on this particular cell (Block S170). If the EVM with a lower p-a configuration is still too high for the downlink data transmission with 256 QAM to the wireless device 14 then HOM still should not be configured to wireless devices 14 for this cell. However, if lower p-a offset values are available, a p-a value for HOM mode capable wireless devices 14 is defined and stored in database 190. The p-a offset value for HOM mode configuration may also depend upon the number of antenna ports. More antenna ports may result in a lower value of p-a selected for HOM mode configuration.

In some embodiments, an additional power balancing parameter (p-b) can be used to account for power differences between type A and type B OFDM symbols (Block S180). The p-b balancing parameters are 3GPP defined cell-specific parameters. If the p-b value is designed for the power level only considering the p-a value used for legacy wireless device data transmission, unbalanced radio power transmission may occur if at a TTI there are HOM wireless devices 14 conducting the data transmission. Therefore, when a cell is deployed with HOM support using different p-a values, depending on how many wireless devices 14 are potentially configured with HOM mode, p-b values may be adjusted to balance the power level between type A and type B OFDM symbols. Balancing power with the use of p-b values will not cause a uniform power distribution across the data symbols. Rather, there will be different power in the data symbols due to the different p-a values. Only the power in the reference symbols is controlled.

If one p-a offset value is used for legacy modulation mode and a different p-a offset value is used for HOM mode, a scheduling strategy may be needed. Scheduling HOM mode wireless devices 14 and legacy modulation mode wireless devices 14 in the same TTI may prevent HOM mode wireless devices 14 from obtaining a desired low EVM when the HOM mode is used. If the p-a offset value used for HOM mode is not low enough, the desired EVM may not be achieved even if only HOM mode wireless devices 14 are scheduled in a TTI (no other legacy mode wireless devices 14). Applying Peak to Average Power Reduction (PAPR) for smoothing radio power level may result in higher PDSCH power that was originally applied on PDSCH REs for legacy modulation mode wireless devices 14 to be added to HOM configured wireless devices 14. In order to avoid having undesired power added to the REs for HOM mode configured wireless devices 14, several strategies may be employed. For example, based on the p-a power offset value for legacy modulation mode and the p-a power offset value for HOM mode, a lookup table may be defined (Block S200). In one embodiment, the table indicates that if a certain number of PRBs are used for legacy mode wireless device 14, the remaining PRBs may not be fully used for HOM mode wireless device 14. Some PRBs may have to be left empty in order to reduce radio transmit power. By leaving a number of PRBs not scheduled, the PAPR level for that TTI may be lowered. The empty PRBs have no power allocated to them. The lookup table is generated such that the EVM would not exceed a tolerant limit for 256 QAM data transmission. The lookup table may be stored in database 210.

If one p-a value offset value is used for legacy modulation mode and a different p-a offset value is used for HOM mode and network entity 12 is scheduling HOM mode capable wireless devices 14 only and no other legacy mode wireless devices 14 during a TTI, then network entity 12 may assign a HOM PRB limitation to the HOM mode wireless device 14, the PRB limitation resulting in unused PRBs for the TTI. It should be noted that databases 110, 190 and 210 may be the same database or be separate databases and may be distributed among different physical hardware platforms or incorporated in a single physical hardware platform.

Figure 3:
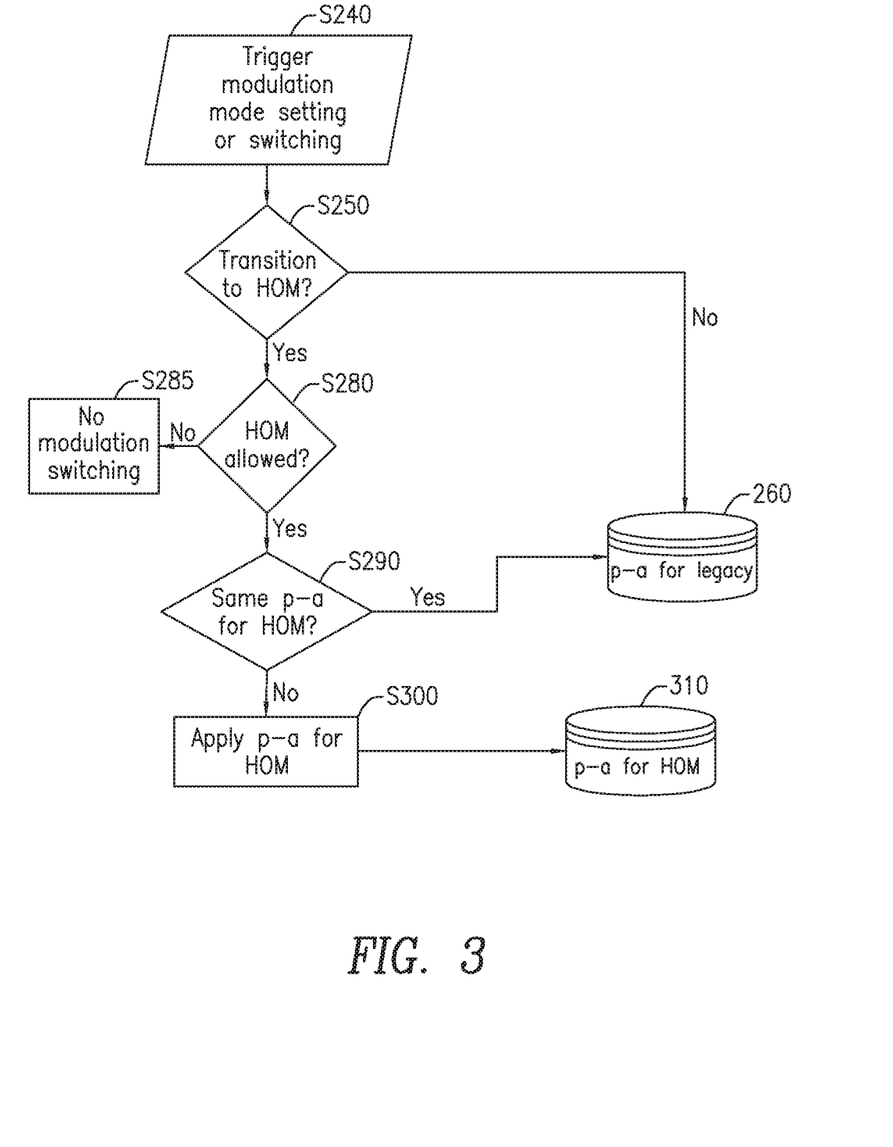
FIG. 3 is a flowchart illustrating an exemplary method for power offset value configuration for HOM mode and legacy modulation mode wireless devices in accordance with the principles of the present disclosure.

HOM mode capable wireless devices 14 may be configured with either HOM mode or legacy modulation mode at run time. FIG. 3 is a flow diagram illustrating steps performed by network entity 12 for configuring p-a power offset values for HOM mode wireless devices 14 and legacy modulation mode wireless devices 14. In FIG. 3, network entity 12 may receive a trigger to switch at least one of the HOM capable wireless devices 14 from legacy modulation mode to HOM mode (Block S240). The present disclosure is not limited to the type of trigger received by network entity 12 to initiate the switching of a wireless device 14 from legacy modulation mode to HOM mode. In one embodiment, the trigger is based on at least a distance between the HOM mode capable wireless device 14 and network entity 12. For example, when a HOM mode capable wireless device 14 is within a predetermined distance from network entity 12, this could trigger a switch from legacy modulation mode to HOM mode because the wireless device 14 is in close proximity to network entity 12, has a strong RF connection, and therefore does not require large transmission power for downlink data reception (i.e., the power offset value p-a can remain low). On the other hand, if the HOM mode capable wireless device 14 moves away from the network entity 12, i.e., beyond a predetermined distance from network entity 12, it remains in legacy modulation mode with a higher power offset value p-a. This provides enough average radio power for transmission downlink data so the wireless device 14 can still receive data at lower modulations. In another embodiment, the trigger is based upon at least one of channel quality indicator (CQI) information received in the CQI report from an uplink transmission of wireless device 14 and an outer loop adjustment value for maintaining a target BLER. In yet another embodiment, the trigger may be based on both distances between the HOM mode capable wireless device 14 and network entity 12 and another factor, such as CQI information received in the CQI report, or receipt of a HARQ.

Continuing to refer to FIG. 3, network entity 12 determines if the wireless device 14 is to be transitioned to HOM mode (Block S250). If there is not a transition to HOM mode, the power offset value p-a for legacy modulation mode that was previously assigned may be stored in database 260. If there is a transition to HOM mode, it is determined whether HOM mode for HOM mode capable wireless devices 14 is allowed (Block S280). This decision could be based on insufficient power headroom (shown in Block S130 of FIG. 2) or because there is no lower p-a values available (shown in Block S160 of FIG. 2). If HOM mode is not allowed, no modulation switching occurs (Block S285). If HOM mode is allowed it is determined if the offset p-a value for HOM mode is the same as the legacy power offset value p-a (Block S290) and if so then wireless device 14 is transitioned from legacy modulation mode to HOM mode using the same p-a value for legacy modulation mode, where the p-a value is stored in database 260. If a different p-a power offset value is to be used, then an HOM power offset value is applied (Block S300) ant this p-a value stored in database 310.

The switching decisions made by network entity 12 may ensure that there is enough power headroom when the wireless device 14 is in HOM mode and is ready to use 256 QAM for downlink data transmission. If the power headroom is not sufficient, scheduling rules based on information in the lookup table may be used to create the additional power headroom. These rules may include whether the PRB limitations in the lookup table stored in database 210 is able to compensate for the lack of required power headroom. The switching decisions also ensure that there is enough transmission power when wireless device 14 is at a cell edge and has already been under legacy modulation mode. In one embodiment, once network entity 12 decides to perform a modulation mode switch, it sends an RRC reconfiguration message to the HOM mode capable wireless device 14 confirming that at least one of the HOM mode capable wireless devices is enabled for HOM mode. The RRC reconfiguration message may be sent to wireless device 14 with "CQI-ReportConfig-v1250" IE which contains an "altCQI-Table-r12" entry for either HOM mode or legacy modulation mode indication. In one embodiment, the RRC reconfiguration message contains the legacy mode power offset value if the HOM mode capable wireless device 14 is configured for legacy modulation mode and the HOM mode power offset value if the HOM mode capable wireless device 14 is configured for HOM mode. The power offset mode designated for the modulation mode may be included under "PDSCH-ConfigDedicated" IE in the same RRC reconfiguration message. After the RRC reconfiguration message is sent to wireless device 14, only QPSK is used for downlink data transmission until network entity 12 has confirmed that wireless device 14 has received the RRC reconfiguration message. Otherwise, the use of other modulations may cause wireless device 14 decoding failures due to inconsistent p-a assumptions between network entity 12 and wireless device 14.

Link adaptation may be performed by network entity 12 by using the wireless device 14 Channel Status Indication (CSI) reports and outer loop adjustments based on the wireless device's acknowledgement of downlink data transmissions. The goal for the link adaptation is to maintain a desired BLER. In order to avoid link adaptation influenced by occasional spikes from the wireless device 14 CSI reports, network entity 12 may maintain filtered Gain to Interference Noise Ratio (GINR) values based on current and previously reported CSI and the Power Spectral Density (PSD) used for downlink data transmission over PDSCH ($PSD_{PDSCH}$) according to the following:

$$GINR_{received} = SINR_{received} - PSD_{PDSCH},$$

where $SINR_{received}$ is obtained by the CQI value within the CSI report by using current modulation based CQI table conversion, and $PSD_{PDSCH}$ is the power spectrum density applied on the downlink data transmission with the current modulation mode. It should be noted that, in some embodiments, PSD is derived from EPRE. If the previous CSI report received by network entity 12 is from the same modulation mode, the same $PSD_{PDSCH}$ is applied. The filtered GINR is then calculated as:

$$GINR_{filtered}=a*GINR_{received}+(1-a)*GINR_{filtered},$$
where $0 \leq a \leq 1$ When a modulation mode switch is conducted with a different p-a configuration, the $PSD_{PDSCH}$ is changed. Upon receiving the first CSI report after the modulation mode switch, if network entity 12 decides to continue filtering the GINR after the switch with those received before the switch, the difference between the p-a used for the two different modes needs to be considered as follows:

$$GINR_{filtered}=b*GINR_{received}+(1-b)*(GINR_{filtered}-\Delta pa),$$

where $0 \leq b \leq 1$, and $\Delta pa$ is the difference between the $PSD_{PDSCH}$ used after and before modulation mode transition.

Outer loop link adaptation provides a cumulated SINR offset based on the acknowledgement by wireless device 14 for downlink data transmissions. MCS selection for later downlink data transmission considers both filtered GINR values and the offset provided by the outer loop adjustment. If modulation mode switch occurs with a different p-a power offset value applied to the target mode, previously cumulated adjustment offset values may not be an optimized value under certain conditions. If a lower p-a value is provided for HOM mode configuration, potentially lower EVM will help in better decoding ability for wireless devices 14 with high SINR. If the switching threshold from legacy modulation mode to HOM mode is designed to a point that wireless device 14 is almost ready to use 256 QAM, a positive switch gain due to the lower p-a offset value can be added to the outer loop adjustment offset after the modulation mode switch is complete. This will help network entity 12 increase the communication rate of wireless device 14 by using 256 QAM as follows:

$$OFFSET_{outerloop}=OFFSET_{outerloop}-c*\Delta pa,$$

where $\Delta pa=p-a_{HOM}-p-a_{legacy}<0$, and $c>0$ is a parameter for $\Delta pa$ impact adjustment. If the switching threshold from HOM mode to legacy modulation mode is relatively low, the radio power level may be a factor. A potentially higher transmission power may also provide positive impact, which can be performed by the following equation after the modulation mode switch is complete:

$$OFFSET_{outerloop}=OFFSET_{outerloop}+d*\Delta pa,$$

where $\Delta pa=p-a_{legacy}-p-a_{HOM}>0$, and $d>0$ is a parameter for $\Delta pa$ impact adjustment. If the modulation mode switching thresholds were set at approximately medium range, the radio power levels may not play a factor and the above adjustments may be omitted.

Figure 4:
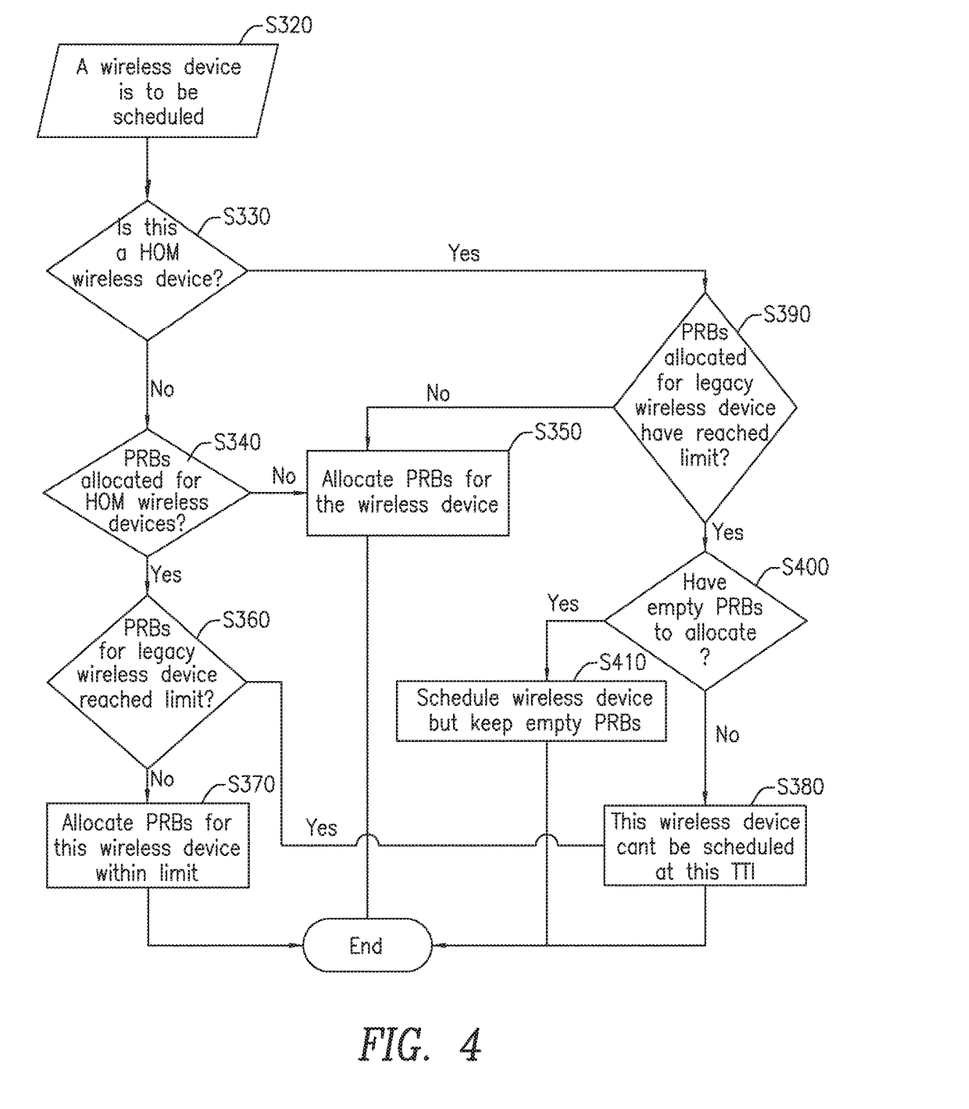
FIG. 4 is a flowchart illustrating an exemplary method for scheduling HOM mode and legacy modulation mode wireless devices in the same TTI in accordance with the principles of the present disclosure.

If different p-a power offset values are used for different modulation modes, strategies for scheduling both HOM mode wireless devices 14 and legacy modulation mode wireless devices 14 are employed to avoid interference. FIG. 4 is a flow diagram illustrating an exemplary process for scheduling HOM mode and legacy modulation mode wireless devices 14 in the same TTI. Network entity 12 determines that a wireless device 14 is to be scheduled (Block S320). Network entity 12 then determines if the wireless device being scheduled is a HOM mode wireless device 14 (Block S330). If the wireless device 14 to be scheduled is not a HOM wireless device 14, normal legacy modulation mode wireless device scheduling occurs. Network entity 12 determines if there are any PRBs allocated for HOM mode wireless devices 14 (Block S340). If no PRBs have been allocated for HOM mode wireless devices 14 then only legacy modulation mode wireless devices 14 have been scheduled so far and the PRBs may be allocated for the wireless device currently being scheduled (Blocks 350). If PRBs have been allocated for HOM mode wireless devices it is determined if the PRBs for legacy modulation mode wireless devices have reached their limit (Block S360). If not, meaning there are available PRBs, then the PRBs are allocated, up to their limit, for the wireless device 14 currently being scheduled (Block S370). However, if the PRBs for the legacy modulation mode wireless devices 14 have reached their limit then the wireless device 14 cannot be scheduled in this TTI since there are no available PRBs (Blocks S380).

In an alternate embodiment, rather than implementing the wireless device scheduling process illustrated in FIG. 4, the following exemplary scheduling routine may be implemented.

When there are still PRBs available and wireless devices 14 to be scheduled, for the next wireless device 14:

```
If the wireless device 14 is HOM capable and is in HOM mode,
    Given the total number of PRBs allocated to legacy wireless devices
    or HOM capable wireless devices in legacy mode so far
    determine the number of empty PRBs
    If the PRBs that can be allocated to HOM mode device is more than
    enough
        Allocate number of PRBs that is needed
    Else
        Allocate all non-empty PRBs
    End
Else
    Given the total number of PRBs allocated to HOM capable wireless
    devices in HOM mode so far, determine the number of empty PRBs
    If the PRBs that can be allocated to legacy wireless devices or HOM
    capable wireless devices in legacy mode is more than enough
        Allocate number of PRBs that is needed
    Else
        Allocate all non-empty PRBs
    End
End
```

If, at Block S330, it is determined that the wireless device 14 being scheduled is a HOM mode wireless capable device 14 then network entity 12 determines if the PRBs allocated for the legacy modulation mode wireless devices 14 have reached their limit (Block S390). If the PRB limit for legacy modulation mode wireless devices 14 has not been reached then PRBs are allocated for the wireless device 14 currently being scheduled (Block S350). If the PRB limit for legacy modulation mode wireless devices 14 has been reached then network entity 12 determines if there are any unused PRBs to allocate (Block S400). If no unused PRBs are available then the wireless device 14 cannot be scheduled during this TTI (Block S380). However, if unused PRBs are available to allocate, the wireless device 14 may be scheduled during this TTI and the unused or empty PRBs remain unused (Block S410).

Figure 5:
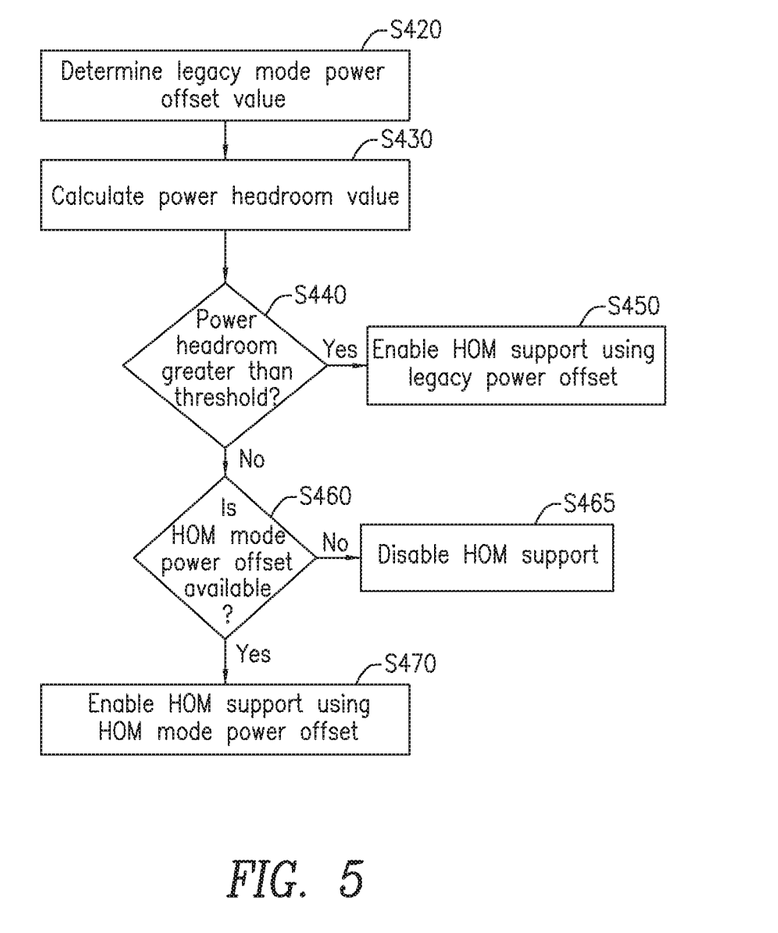
FIG. 5 is a flowchart illustrating a method for enabling HOM mode support for HOM mode capable wireless devices in accordance with the principles of the present disclosure.

FIG. 5 illustrates a flow diagram of an exemplary method for enabling HOM mode support for HOM mode capable wireless devices 14 in accordance with the principles of the present disclosure. Network entity 12 determines a legacy mode power offset (p-a) value for at least one of the at least one HOM mode capable wireless device 14 in legacy modulation mode (Block 420) and calculates a power headroom value for sending downlink data to the at least one HOM mode capable wireless device 14 (Block S430). When network entity 12 determines that the calculated power headroom value exceeds a threshold value (Block S440), HOM mode support for HOM mode capable wireless devices 14 is enabled for network entity 12 using the legacy power offset value (Block S450). However, when the power headroom value does not exceed the threshold value, network entity 12 determines if a HOM mode power offset value is available (Block S460). The HOM mode power offset value corresponds to a lower EPRE than an EPRE corresponding to the legacy mode power offset value. When the HOM mode power offset value is not available, HOM support is disabled (Block S465). When the HOM mode power offset value is available, HOM mode support for HOM mode capable wireless devices 14 is enabled in network entity 12 using the HOM mode power offset value (Block S470).

As described above, if the HOM mode support is enabled, network entity 12 may receive a trigger to switch at least one of the HOM capable wireless devices 14 from at least one of the legacy modulation mode to the HOM mode and the HOM mode to the legacy modulation mode. In one embodiment, the trigger is based on at least a distance between the at least one HOM mode capable wireless device 14 and network entity 12. In another embodiment, the trigger is based upon at least one of CQI information received from an uplink transmission of the wireless device 14 and an outer loop adjustment value for maintaining a target BLER.

In another embodiment, network entity 12 transmits, to at least one of the HOM mode capable wireless devices 14, a RRC reconfiguration message, the RRC reconfiguration message requesting that at least one of the HOM mode capable wireless devices 14 is enabled for the HOM mode. The RRC reconfiguration message may contain one of the legacy mode power offset value if the at least one HOM mode capable wireless device 14 is configured for legacy modulation mode and the HOM mode power offset value if the at least one HOM mode capable wireless device 14 is configured for HOM mode.

In another embodiment, a power balancing parameter (p-b) is assigned to at least one of the HOM mode capable wireless devices 14, where the balancing parameter accounts for differences between OFDM symbols.

In another embodiment, when the HOM power offset value is different from the legacy power offset value, network entity 12 is configured to schedule at least one of the HOM mode capable wireless devices 14 and at least one legacy modulation mode wireless device 14 during a TTI. The scheduling may include determining a number of unused PRBs based on a number of PRBs allocated to at least one of at least one non-HOM mode capable wireless device 14 and the at least one HOM mode capable wireless device 14 in legacy modulation mode. In addition or alternatively, the scheduling may include determining a number of unused PRBs based on a number of PRBs allocated to the at least one HOM mode capable wireless device 14 in HOM mode.

In another embodiment, when the HOM power offset value is different from the legacy power offset value, network entity 12 is configured to schedule at least one of the HOM mode capable wireless devices 14 and no other legacy mode wireless devices 14 during a TTI. The scheduling includes assigning, to at least one of the HOM mode capable wireless devices 14, a number of unused PRBs for the TTI based on at least one of a number of PRBs allocated to the at least one HOM mode capable wireless device 14 and the HOM mode power offset value.

Figure 6:
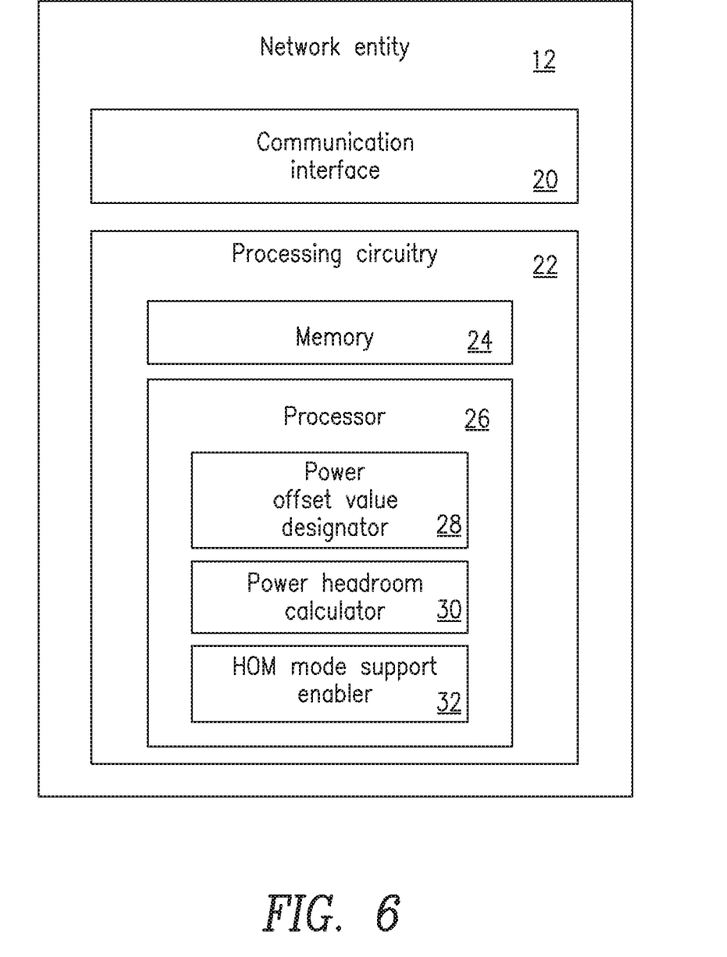
FIG. 6 is a block diagram of an exemplary network entity configured to enable HOM mode in HOM mode capable wireless devices in accordance with principles of the present disclosure.

In another embodiment, network entity 12 receives acknowledgement that the at least one HOM capable wireless device 14 has received the downlink data sent to it. Network entity 12 may perform link adaptation after the switch of the at least one of the at least one HOM capable wireless device 14 from at least one of the legacy modulation mode to the HOM mode and the HOM mode to the legacy modulation mode. Performing the link adaption includes calculating a gain to interference noise ratio (GINR), after the switch of the at least one of the at least one HOM capable wireless device from the legacy modulation mode to the HOM mode. The calculated GINR incorporates a difference between a first power spectrum density (PSD) value measured before the switch and a second PSD value measured after the switch FIG. 6 is a block diagram of an exemplary network entity 12 configured to enable HOM mode support for at least one HOM mode capable wireless device 14 in accordance with principles of the present disclosure. In FIG. 6, network entity 12 includes a communication interface 20 configured to receive an uplink communication from the at least one HOM mode capable wireless device 14, and processing circuitry 22. Processing circuitry 22 includes a memory 24 and a processor 26, the memory in communication with processor 26, and memory 24 having instructions that, when executed by processor 26, configure processor 26 to perform a number of functions. In some embodiments, processing circuitry 22 may comprise integrated circuitry for processing and/or control, e.g., one or more processors and/or processor cores and/or FPGAs (Field Programmable Gate Array) and/or ASICs (Application Specific Integrated Circuitry). Processing circuitry 22 may comprise and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc.

Processing circuitry 22 may be configured to perform any of the methods described herein and/or to cause such methods to be performed, e.g., by network entity 12. Corresponding instructions may be stored in the memory 24, which may be readable and/or readably connected to processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory 24, which may be adapted to be accessible for reading and/or writing by the controller and/or processing circuitry 22.

A power offset value designator 28 within processor 26 is configured to determine a legacy mode power offset value for at least one of the at least one HOM mode capable wireless device 14 in a legacy modulation mode. Power headroom calculator 30 within processor 26 is configured to calculate a power headroom value for sending downlink data to the at least one HOM mode capable wireless device 14. When processor 26 determines that the power headroom value exceeds a threshold value, an HOM mode support enabler 32 within processor 26 enables the HOM mode support for at least one of the at least one HOM mode capable wireless device 14 using the identified legacy mode power offset value. When the power headroom value does not exceed the threshold value, processor 26 determines if a HOM mode power offset value is available. The HOM mode power offset value corresponds to a lower EPRE, than an EPRE corresponding to the legacy mode power offset value. When the HOM mode power offset value is available, the HOM mode enabler 32 enables the HOM mode support for at least one of the at least one HOM mode capable wireless device 14 using the HOM mode power offset value.

Figure 7:
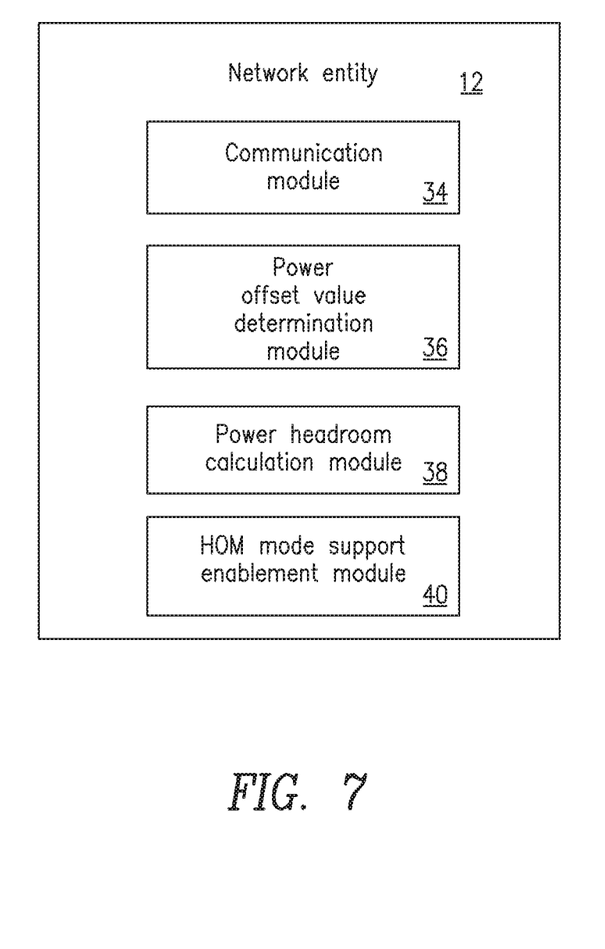
FIG. 7 is a block diagram of an alternate network entity configured to enable HOM mode in HOM mode capable wireless devices in accordance with principles of the present disclosure.

FIG. 7 is a block diagram of an alternate network entity 12 configured to enable HOM mode support for at least one HOM mode capable wireless device 14 in accordance with principles of the present disclosure. In FIG. 7, network entity includes a communication module 34 configured to receive an uplink communication from the at least one HOM mode capable wireless device 14. Network entity 12 also includes a power offset value determination module 36 configured to determine a legacy mode power offset value for at least one of the at least one HOM mode capable wireless device 14 in a legacy modulation mode. A power headroom calculation module 38 is configured to calculate a power headroom value for sending downlink data to the at least one HOM mode capable wireless device 14. When network entity 12 determines that the power headroom value exceeds a threshold value, an HOM mode enablement module 40 enables the HOM mode support for at least one of the at least one HOM mode capable wireless device 14 using the identified legacy mode power offset value. When network entity 12 determines that the power headroom value does not exceed the threshold value, network entity 12 determines if a HOM mode power offset value is available. The HOM mode power offset value corresponds to a lower EPRE, than an EPRE corresponding to the legacy mode power offset value. When the HOM mode power offset value is available, the HOM mode enablement module 40 enables the HOM mode support for at least one of the at least one HOM mode capable wireless device 14 using the HOM mode power offset value.

As will be appreciated by one of skill in the art, the concepts described herein may be embodied as a method, data processing system, and/or computer program product. Accordingly, as noted above, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that may be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that may direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Although some of the diagrams include arrows on communication paths to show a primary direction of communication, it is to be understood that communication may occur in the opposite direction to the depicted arrows. Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments may be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present disclosure is not limited to what has been particularly shown and described herein above. In addition, unless mention was made above to the contrary, it should be noted that all of the accompanying drawings are not to scale. A variety of modifications and variations are possible in light of the above teachings without departing from the scope of the disclosure, which is limited only by the following claims.

What is claimed is:

1. A method for enabling higher order modulation, HOM, mode support for at least one HOM capable wireless device, the method comprising:
   determining a legacy mode power offset value for at least one of the at least one HOM mode capable wireless device in legacy modulation mode;
   calculating a power headroom value for sending downlink data to the at least one HOM mode capable wireless device;
   when the power headroom value exceeds a threshold value:
      enabling the HOM mode support for at least one of the at least one HOM mode capable wireless device using the identified legacy mode power offset value;
   when the power headroom value does not exceed the threshold value:
      determining when a HOM mode power offset value is available, the HOM mode power offset value corresponding to a lower energy per resource element, EPRE, than an EPRE corresponding to the legacy mode power offset value; and
      when the HOM mode power offset value is available:
         enabling the HOM mode support for at least one of the at least one HOM mode capable wireless device using the HOM mode power offset value.

2. The method of claim 1, wherein when the HOM mode support is enabled, further comprising receiving a trigger to switch at least one of the at least one HOM capable wireless device from at least one of the legacy modulation mode to the HOM mode and the HOM mode to the legacy modulation mode.

3. The method of claim 2, wherein the trigger is based on at least a distance between the at least one HOM mode capable wireless device and a network entity.

4. The method of claim 2, wherein the trigger is based upon at least one of channel quality indicator, CQI, information received from an uplink transmission of the at least one HOM capable wireless device and an outer loop adjustment value for maintaining a target block error rate, BLER.

5. The method of claim 2, further comprising transmitting, to at least one of the at least one HOM mode capable wireless device, a radio resource control, RRC, reconfiguration message, the RRC reconfiguration message requesting that at least one of the at least one HOM mode capable wireless device is enabled for the HOM mode.

6. The method of claim 5, wherein the RRC reconfiguration message contains one of the legacy mode power offset value when the at least one HOM mode capable wireless device is configured for legacy modulation mode and the HOM mode power offset value when the at least one HOM mode capable wireless device is configured for HOM mode.

7. The method of claim 1, further comprising assigning, to at least one of the at least one HOM mode capable wireless device, a power balancing parameter to account for differences between Orthogonal Frequency Division Multiplexing, OFDM, symbols.

8. The method of claim 1, further comprising:
   scheduling at least one of the at least one HOM mode capable wireless device and at least one legacy modulation mode wireless device during a transmission time interval, TTI, when the HOM power offset value is different from the legacy power offset value, the scheduling comprising:
      determining a number of unused PRBs based on a number of PRBs allocated to at least one of at least one non-HOM mode capable wireless device and the at least one HOM mode capable wireless device in legacy modulation mode.

9. The method of claim 1, further comprising scheduling at least one of the at least one HOM mode capable wireless device and no other legacy mode wireless devices during a transmission time interval, TTI, when the HOM mode power offset value is different from the legacy mode power offset value, the scheduling comprising:
   assigning, to at least one of the at least one HOM mode capable wireless device, a number of unused PRBs for the TTI based on at least one of a number of PRBs allocated to the at least one HOM mode capable wireless device and the HOM mode power offset value.

10. The method of claim 2, further comprising:
    receiving acknowledgement that the at least one HOM capable wireless device received the downlink data; and
    performing link adaptation after the switch of the at least one of the at least one HOM capable wireless device from at least one of the legacy modulation mode to the HOM mode and the HOM mode to the legacy modulation mode, wherein performing the link adaption includes calculating a gain to interference noise ratio, GINR, after the switch of the at least one of the at least one HOM capable wireless device from the legacy modulation mode to the HOM mode, the calculated GINR incorporating a difference between a first power spectrum density, PSD, value measured before the switch and a second PSD value measured after the switch.

11. A network entity configured to enable higher order modulation, HOM, mode support for at least one HOM mode capable wireless device, the network entity comprising:
    a communication interface configured to receive an uplink communication from the at least one HOM mode capable wireless device; and
    processing circuitry including a memory and a processor, the memory in communication with the processor, the memory having instructions that, when executed by the processor, configure the processor to:
       determine a legacy mode power offset value for at least one of the at least one HOM mode capable wireless device in a legacy modulation mode;
       calculate a power headroom value for sending downlink data to the at least one HOM mode capable wireless device;
       when the power headroom value exceeds a threshold value:
          enable the HOM mode support for at least one of the at least one HOM mode capable wireless device using the identified legacy mode power offset value;
       when the power headroom value does not exceed the threshold value:
          determine when a HOM mode power offset value is available, the HOM mode power offset value corresponding to a lower energy per resource element, EPRE, than an EPRE corresponding to the legacy mode power offset value; and
          when the HOM mode power offset value is available:
             enable the HOM mode support for at least one of the at least one HOM mode capable wireless device using the HOM mode power offset value.

12. The network entity of claim 11, wherein when the HOM mode support is enabled, the communication interface is further configured to receive a trigger to switch at least one of the at least one HOM mode capable wireless device from at least one of the legacy modulation mode to the HOM mode and the HOM mode to the legacy modulation mode.

13. The network entity of claim 12, where the trigger is based on at least a distance between the at least one HOM mode capable wireless device and the network entity.

14. The network entity of claim 12, wherein the trigger is based upon at least one of channel quality indicator, CQI, information received from an uplink transmission of the at least one HOM mode capable wireless device and an outer loop adjustment value for maintaining a target block error rate, BLER.

15. The network entity of claim 11, wherein the communication interface is configured to transmit, to the at least one HOM mode capable wireless device, a radio resource control, RRC, reconfiguration message, the RRC reconfiguration message requesting that at least one of the at least one HOM mode capable wireless device is enabled for the HOM mode.

16. The network entity of claim 15, wherein the RRC reconfiguration message contains one of the legacy mode power offset value when the at least one HOM mode capable wireless device is configured for legacy modulation mode and the HOM mode power offset value when the at least one HOM mode capable wireless device is configured for HOM mode.

17. The network entity of claim 11, wherein the processor is further configured to assign, to at least one of the at least one HOM mode capable wireless device, a power balancing parameter to account for power differences between the Orthogonal Frequency Division Multiplexing, OFDM symbols.

18. The network entity of claim 11, wherein the processor is further configured to:
schedule at least one of the at least one HOM mode capable wireless device and at least one legacy mode wireless device during a transmission time interval, TTI, when the HOM mode power offset value is different from the legacy mode power offset value, the scheduling comprising:
determining a number of unused PRBs based on a number of PRBs allocated to at least one of at least one non-HOM mode capable wireless device and the at least one HOM mode capable wireless device in legacy modulation mode.

19. The network entity of claim 11, wherein the processor is further configured to:
schedule at least one of the at least one HOM mode capable wireless device and no other legacy mode wireless devices during a transmission time interval, TTI, when the HOM mode power offset value is different from the legacy power offset value, the scheduling comprising:
assigning, to at least one of the at least one HOM mode capable wireless device, a number of unused PRBs for the TTI based on at least one of a number of PRBs allocated to the at least one HOM mode capable wireless device and the HOM mode power offset value.

20. The network entity of claim 11, wherein the network entity is a base station.

21. The network entity of claim 12, wherein the communication interface is configured to receive acknowledgement that the at least one HOM capable wireless device received the downlink data, the processor further configured to:
perform link adaptation after the switch of the at least one of the at least one HOM capable wireless device from at least one of the legacy modulation mode to the HOM mode and the HOM mode to the legacy modulation mode, wherein performing the link adaption includes calculating a gain to interference noise ratio, GINR, after the switch of the at least one of the at least one HOM capable wireless device from the legacy modulation mode to the HOM mode, the calculated GINR incorporating a difference between a first power spectrum density, PSD, value measured before the switch and a second PSD value measured after the switch.

22. A network entity configured to enable higher order modulation, HOM, mode support for at least one HOM mode capable wireless device, the network entity comprising:
a communication module configured to receive an uplink communication from the at least one HOM mode capable wireless device;
a power offset value determination module configured to determine a legacy mode power offset value for at least one of the at least one HOM mode capable wireless device in a legacy modulation mode;
a power headroom calculation module configured to calculate a power headroom value for sending downlink data to the at least one HOM mode capable wireless device; and
an HOM mode enablement module configured to:
when the power headroom value exceeds a threshold value:
enable the HOM mode support of at least one of the at least one HOM mode capable wireless device using the identified legacy mode power offset value;
when the power headroom value does not exceed the threshold value:
determine when a HOM mode power offset value is available, the HOM mode power offset value corresponding to a lower energy per resource element, EPRE, than an EPRE corresponding to the legacy mode power offset value; and
when the HOM mode power offset value is available: enable the HOM mode support for at least one of the at least one HOM mode capable wireless device using the HOM mode power offset value.

* * * * *